(12) United States Patent
Zas Couce et al.

(10) Patent No.: US 8,688,097 B2
(45) Date of Patent: Apr. 1, 2014

(54) FREQUENCY CONFIGURATION OF FEMTO-CELL BASE STATIONS

(75) Inventors: Luis Gabriel Zas Couce, Madrid (ES); Jose Angel Perez De La Rosa, Madrid (ES); Francisco Javier Dominguez Romero, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 111 days.

(21) Appl. No.: 13/149,799

(22) Filed: May 31, 2011

(65) Prior Publication Data

US 2012/0108223 A1    May 3, 2012

(30) Foreign Application Priority Data

May 31, 2010 (ES) .................... 201030831

(51) Int. Cl.
*H04M 3/00* (2006.01)

(52) U.S. Cl.
USPC ........... 455/418; 455/444; 455/447; 455/450; 455/561

(58) Field of Classification Search
None
See application file for complete search history.

(56) References Cited

U.S. PATENT DOCUMENTS

| | | | |
|---|---|---|---|
| 2007/0097939 A1 | 5/2007 | Nylander et al. | |
| 2009/0098871 A1* | 4/2009 | Gogic | 455/435.1 |
| 2009/0149194 A1* | 6/2009 | Howard | 455/456.1 |
| 2009/0213730 A1 | 8/2009 | Zeng et al. | |
| 2009/0253421 A1 | 10/2009 | Camp, Jr. et al. | |
| 2010/0120438 A1 | 5/2010 | Kone | |
| 2010/0273474 A1* | 10/2010 | Carmon et al. | 455/424 |
| 2011/0030035 A1* | 2/2011 | Wu | 726/4 |
| 2011/0086614 A1* | 4/2011 | Brisebois et al. | 455/411 |

FOREIGN PATENT DOCUMENTS

EP    2112846 A1    10/2009

OTHER PUBLICATIONS

U.S. Appl. No. 13/149,805, filed May 31, 2011, Zas Couce et al.
Spanish Search Report for ES 201030831 dated May 31, 2010.

* cited by examiner

*Primary Examiner* — Suhail Khan
(74) *Attorney, Agent, or Firm* — Workman Nydegger

(57) ABSTRACT

A method and apparatus for reconfiguring an operational frequency and associated bandwidth used by a femto-cell base station are disclosed. The femto-cell is configured to provide coverage to a User Equipment by connecting to a core telecommunications network via a gateway device. The method includes checking a list of frequencies and associated bandwidths available to a wireless network interface of the femto-cell base station and determining if any of the frequencies in the list matches the operational frequency supported by the User Equipment to which the femto-cell base station is providing coverage. If at least one frequency matches the one supported by the User Equipment, a second frequency is selected from the list of frequencies, said second frequency being established as the operational frequency of the femto-cell base station.

15 Claims, 2 Drawing Sheets

US 8,688,097 B2

FREQUENCY CONFIGURATION OF FEMTO-CELL BASE STATIONS

CROSS-REFERENCE TO RELATED APPLICATIONS

This Application claims priority to and the benefit of Spanish Patent Application No. ES P201030831, filed May 31, 2010, which is incorporated herein by reference in its entirety.

FIELD

Embodiments of the present invention are directed to the field of mobile communications, and more specifically to a method for modifying the frequency configuration of femto-cell base stations, such as 3 G femto-cell base stations or Home Node Bs (HNB).

BACKGROUND

In order to provide enhanced indoor cellular telecommunications network coverage at a customer's home or office, it is known (see FIG. 1) to provide the customer with a femto-cell base station 10, also known as Home Node B (HNB) or simply as a femto-cell. The Home Node B 10 typically has an xDSL router and modem, thereby facilitating the provision of different native cellular telecommunications services (both voice and data services) by using an existing customer xDSL line 11 to connect the Home Node B 10 to the core network 30 of the cellular telecommunications network 40. The Home Node B 10 and xDSL router and modem device may be separate devices (as in FIG. 1) or a single hybrid device.

A further development of the router device, combines the xDSL router and modem device with a cellular telecommunications modem (e.g. an HSPA modem or HSPA USB dongle); the cellular telecommunications modem is configured to provide a wireless connection with the cellular telecommunications network 40 in case the xDSL connection fails, or also at the time of first using the device (if the xDSL line has not been provided and is not working yet).

Problems may arise when both the Home Node B 10 and the cellular telecommunications modem use radio frequencies associated with the same cellular telecommunications network. In particular, problems may occur with the available carriers: the carrier frequency allocated to the HNB 10 (for indoor communications) can be the same as the "macro layer" carrier frequency or frequencies used by the cellular telecommunications modem. Therefore, if there is a failure in the DSL line (or there is no operational xDSL line for some other reason) and the HSPA backup starts working, there may be interference thereby preventing the femto-cell base station or Home Node B and the macro network connection from working simultaneously.

Currently, such interference (i.e. whenever there the DSL link is not available for some reason and the cellular telecommunications modem has to be activated to provide backup connection), may be avoided by automatically disabling the Home Node B.

Were the Home Node B not to be disabled, the interference between the wireless connection to the macro network and the Home Node B connection with the customer's mobile terminal may significantly degrade the customer experience.

BRIEF SUMMARY

Embodiments of the present invention are directed to a method and an apparatus for reconfiguring an operational frequency and associated bandwidth used by a femto-cell base station.

An example method or apparatus may provide a communication service environment at the customer's home (or office) by enabling the simultaneous operation, without interference, of a femto-cell connected to the customer and to the 3 G network simultaneously.

A first aspect of an example embodiment of the invention relates to a method for reconfiguring an operational frequency f2 and associated bandwidth used by a femto-cell base station, preferably a Home Node B, the femto-cell being configured to provide coverage to a User Equipment by connecting said user equipment to a core telecommunications network via a gateway device (typically a Home Node B gateway), the femto-cell having a fixed network interface for establishing a fixed network connection to said core telecommunications network; and a wireless network interface for establishing a cellular wireless network connection to said core telecommunications network, said cellular wireless network connection being assigned a main frequency f1 and associated bandwidth, the method comprising the steps of:

checking a list of frequencies and associated bandwidths available to the wireless network interface, which list can be stored in the Home Node B (during the configuration setup) or it can obtained from the telecommunications network;

determining if any of the frequencies in said list matches the operational frequency supported by the User Equipment to which the femto-cell is providing coverage;

if at least one frequency matches the one supported by the User Equipment, selecting a second frequency from the list of frequencies, said second frequency being established as the operational frequency of the femto-cell.

In case the list of frequencies is obtained from the network, it can be provided by the Home Node B-Gateway, the Home Node B Management System or any other equipment.

According to one embodiment, the second frequency is selected on the basis that it is most separated from said main frequency. So, the step of selecting the second frequency may be performed on the basis of the main and second frequencies and their associated bandwidths being as different as possible in terms of their numeric value or in terms of harmonics, thereby minimising the interference.

Another possibility is that said second frequency is selected on the basis that it fulfils a predefined criterion in terms of interference quality, and it is the preferred by the telecommunications network operator in terms of traffic usage (not necessarily the most separate one from the main frequency in the radio-frequency spectrum).

It is also possible that the second frequency is selected on the basis that the power introduced by the second frequency into the main frequency, and vice versa, is kept to a minimum.

The femto-cell base station or Home Node B may be deactivated when no available frequency matches the one supported by the User Equipment; the user equipment being forced then to revert to a macro-cell wireless network connection rather than the femto-cell connection normally offered by the Home Node B.

The wireless network interface may be a cellular modem module suitable for connecting at least one electronic processing device to the cellular telecommunications network.

The technology used by the femto-cell or Home Node B and the wireless network interface may be UMTS/3 G.

Alternatively, the technology used by the femto-cell or Home Node B and the wireless network interface may be LTE.

In accordance with a second aspect of an example embodiment of the invention, there is provided apparatus, such as a connection manager, for reconfiguring an operational frequency f2 and associated bandwidth used by a femto-cell base station; the femto-cell being configured to provide coverage to a user equipment by connecting to a core telecommunications network and having a fixed network interface for establishing a fixed network connection to said core telecommunications network; and a wireless network interface for establishing a cellular wireless network connection to said core telecommunications network, said cellular wireless network connection being assigned a main frequency f1 and associated bandwidth, the apparatus comprising a connection manager for setting the operational frequency of the femto-cell, the connection manager including a processor configured to:

check a list of frequencies and associated bandwidths available to the wireless network interface;

determine whether any of the frequencies in said list matches the operational frequency supported by the User Equipment to which the femto-cell is providing coverage; and, select a second frequency from the list of frequencies if at least one frequency matches the one supported by the User Equipment, said second frequency being established as the operational frequency of the femto-cell, whereby the apparatus ensures that the femto-cell and the wireless network interface each operate at a different frequency.

Said second frequency can be selected on the basis that is most separated from the main frequency in the radio-frequency spectrum.

Said second frequency can be selected on the basis that the interference measured in said second frequency with respect to the main frequency is below a pre-established threshold.

Or said second frequency is selected on the basis that isolation between the second frequency and the main frequency is the highest possible.

Said second frequency can be also selected on the basis that it fulfils a predefined criterion in terms of interference quality and that it is preferred by the telecommunications network operator in terms of traffic usage.

The femto-cell base station may be deactivated when no available frequency matches the one supported by the User Equipment.

Advantages of some embodiments of the proposed invention will become apparent in the description that follows.

DETAILED DESCRIPTION OF EXAMPLE EMBODIMENTS

Reference will now be made in detail to some example embodiments of the present invention.

Figure 1:
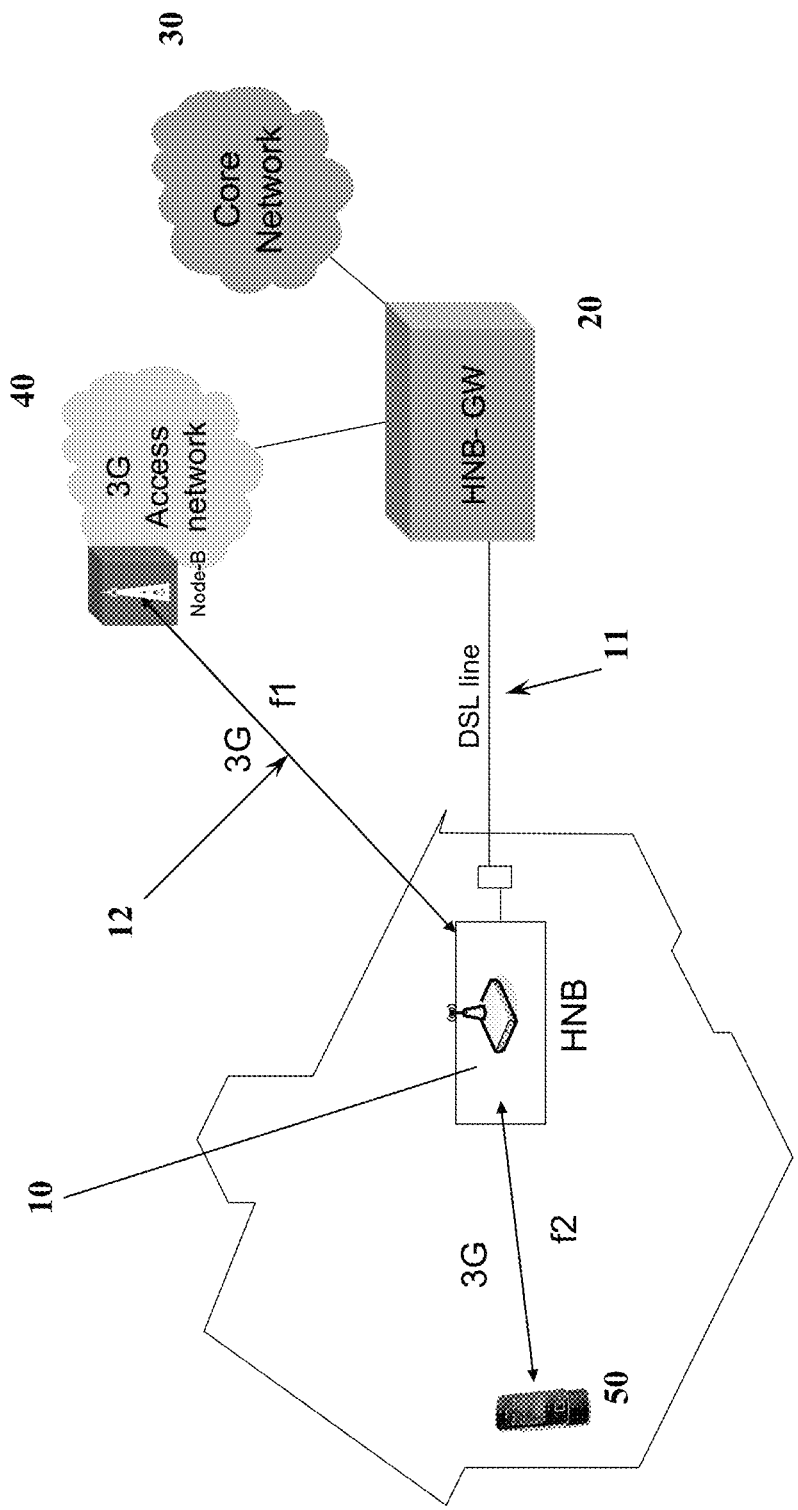
FIG. 1 schematically shows a Home Node B connection at a customer's home (or office).

As it has been indicated above (and shown in FIG. 1), it is possible to provide a Home Node B 10 with a specific DSL modem combined with an HSPA modem (e.g. an integrated modem component or a detachable HSPA USB dongle). This Home Node B 10 is provided to improve the customer's 3 G coverage, which can be integral with the HSPA and DSL modem or can also be a separate device. In the illustrated example the operational frequency used by this Home Node B to provide coverage to a user equipment 50 is denoted f2.

This Home Node B is also configured to detect any DSL link unavailability. The DSL link may be unavailable for a variety of different reasons, for instance:

the DSL line may not yet have been set up for the customer;

the DSL may fail during the lifecycle of the connection (as might happen if the relevant cable were physically cut or a DSLAM component were to fail in the exchange).

In both cases, the Home Node B is configured to activate the HSPA modem to establish a cellular wireless network connection, and to automatically disable the cellular operation of the Home Node B.

Then the HSPA modem detects the macro-cell frequency f1 and tries to establish the HSPA connection 12 with the cellular telecommunications network 40. In case that no frequency is detected (the HSPA USB dongle is unable to connect to the 3 G network), then the Home Node B 10 is switched on again.

If however the Home Node B has been able to create an alternative route to the core telecommunications network through the HSPA 3 G network at the main macro-cell frequency f1, the Home Node B 10 decides which frequency to use by itself from a list of frequencies (and associated bandwidths) that has been stored in the Home Node B during configuration setup, or tries again to establish a communication via a Home Node B gateway 20, HNB-GW, to obtain the list of frequencies (and associated bandwidths). This list of frequencies can be in the HNB-GW, in the Home Node B Management System (HMS in FIG. 3) or in any other network equipment.

It should be noted that a Home Node B Gateway, HNB-GW, is not a mere gateway; it has the purpose of an RNC presenting itself to the core network as a concentrator of Home Node B connections. The Iu interface between the core network and the HNB-GW has the same purpose as the interface between the core network and an RNC. One Home Node B serves only one cell. Further details of the technical standardised Home Node B can be found in the 3GPP standard TS 25.467 *"UTRAN architecture for 3 G Home Node B (HNB)"*.

Once the backup of the HSPA modem is no longer necessary because the DSL line works again, the HSPA modem is deactivated and the frequency allocation reverts to the initial frequency used.

In certain implementations the Home Node B may scan—periodically, at suitable intervals or triggered by some mechanism (e.g. high interference in the current frequency used)—in order to check whether a better frequency in terms of interference can be used. An interference threshold is defined for a frequency to be considered good enough to be used.

Naturally, this new frequency needs to be supported by the user equipment 50. The Home Node B is operable to determine whether the user equipment UE of the local customer is capable of supporting the different frequency bands, using for example the UE radio capabilities (reported in the RRC messages, see TS 25.331).

Figure 2:
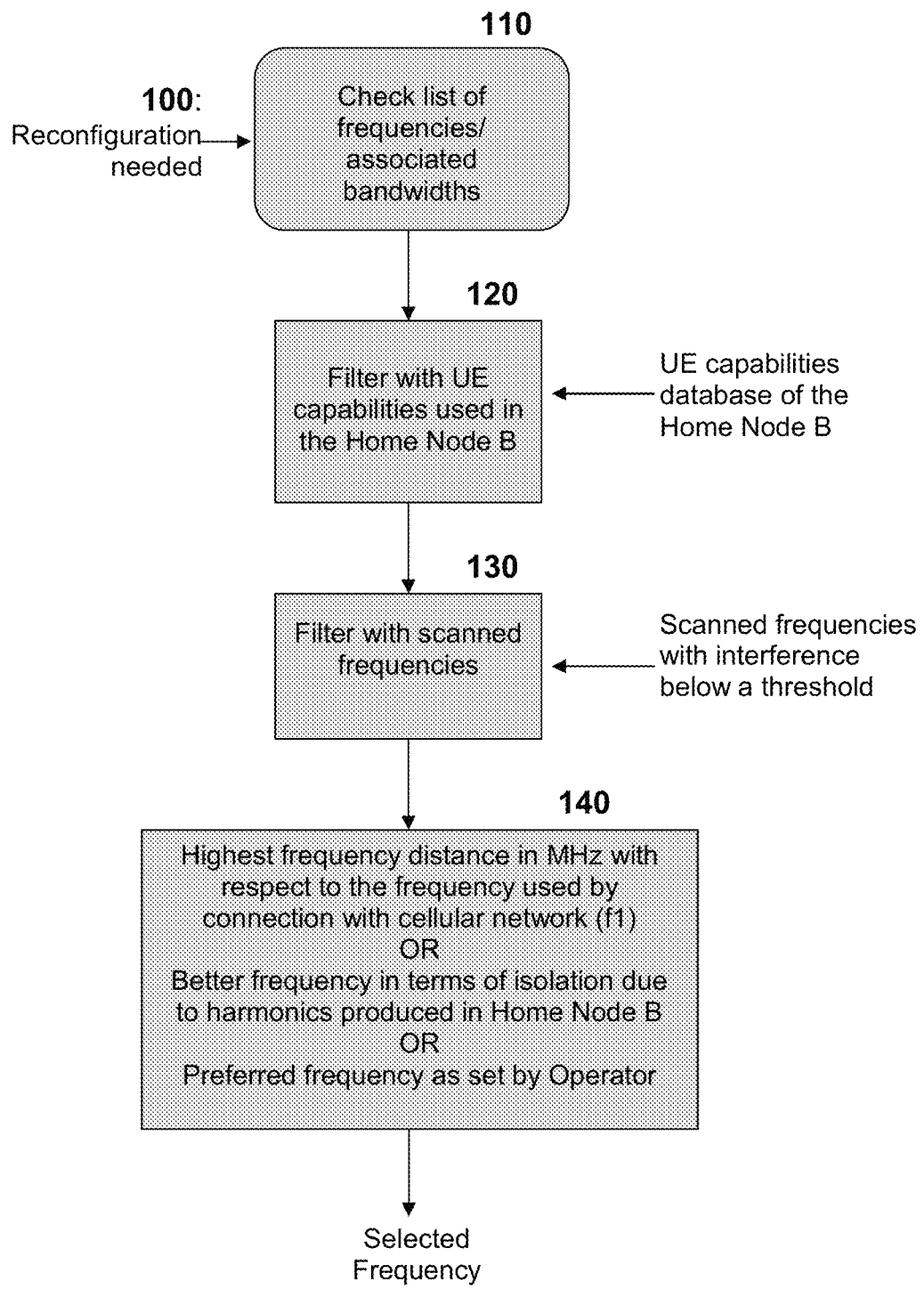
FIG. 2 schematically shows how the selection of the operating frequency is carried out.

As shown in FIG. 2, once it has been determined that a frequency reconfiguration is necessary in the Home Node B (step 100), a list of the frequencies and associated bandwidths allowed to be used is checked (step 110); this list can be sent by the HNB-GW 20, or it can be already stored in the Home Node B.

The Home Node B 10 filters the list of frequencies against the information it has regarding the capabilities of the user equipment (step 120), identifying those entries in that list of frequencies which match the frequencies determined to be supported by the user equipment UE.

While further filtering of the matching frequencies may be unnecessary, the Home Node B may, as illustrated in FIG. 2, further filter the matching frequencies to include only frequencies that exhibit interference parameters below a threshold interference parameter (step 130).

Then, the working frequency f2 which is most suitable for the Home Node B to provide coverage to the UE is chosen. There are several possibilities for this step of choosing the frequency (step 140):

1—calculate the difference between each matching frequency and the main frequency, and select the matching frequency which represents the greatest frequency difference (e.g. when measured in MHz); or,
2—choose the first frequency that fulfils the previous filters of being supported by the user equipment and the interference criteria; or,
3—randomly choose one of the frequencies that fulfils the previous filters of being supported by the user equipment and the interference criteria; or,
4—calculate a parameter corresponding to the isolation between each matching frequency and the main frequency, and select the matching frequency which represents the greatest relative isolation.

The latter calculation may be needed to mitigate interference between the Home Node B frequency and the main frequency arising from the harmonics of the Home Node B frequency. Isolation is understood as the power introduced by one frequency into the other one.

Alternatively the second frequency is selected as the one preferred by the mobile operator; i.e., there is a priority ranking of frequencies, given the preferred choice for certain frequencies.

The selection of the Home Node B frequency can include a step of calculating whether the difference between a matching frequency and the main frequency exceeds a predetermined threshold.

In a further alternative, the selection of the Home Node B frequency includes a step of calculating a parameter corresponding to the isolation between each matching frequency and the main frequency and determining whether that parameter exceeds a predetermined threshold.

Naturally, the selection of a frequency may include one or more of the above filtering steps in any order, permutation or combination.

The foregoing method applies equally to other cellular telecommunications technologies and in particular to LTE. Whatever Radio Access Technology is used (LTE or 3 G), a mechanism is needed for reconfiguring the operational frequency of the Home Node B, and indeed the bandwidth used: in LTE the bandwidth may vary typically it will be a bandwidth selected from 1.4, 3, 5, 10 and/or 20 MHz depending on the availability.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method for reconfiguring an operational frequency and associated bandwidth used by a femto-cell base station, the femto-cell base station being configured to provide coverage to a User Equipment by connecting to a core telecommunications network via a gateway device, the femto-cell base station having a fixed network interface for establishing a fixed network connection to said core telecommunications network, and a wireless network interface for establishing a cellular wireless network connection to said core telecommunications network, said cellular wireless network connection being assigned a main frequency and associated bandwidth, the method comprising the steps of:
    checking a list of frequencies and associated bandwidths available to the wireless network interface;
    determining if any of the frequencies in said list matches an operational frequency supported by the User Equipment to which the femto-cell base station is providing coverage; and
    if at least one frequency matches the operational frequency supported by the User Equipment, selecting a second frequency from the list of frequencies, said second frequency being established as the operational frequency of the femto-cell base station, wherein said second frequency is supported by the User Equipment.

2. The method of claim 1, wherein said second frequency is selected on the basis that the second frequency is most separated from the main frequency in the radio-frequency spectrum.

3. The method of claim 1, wherein said second frequency is selected on the basis that interference measured in said second frequency with respect to the main frequency is below a pre-established threshold.

4. The method of claim 1, wherein said second frequency is selected on the basis that isolation between the second frequency and the main frequency is highest possible.

5. The method of claim 1, wherein said second frequency is selected on the basis that it fulfills a predefined criterion in terms of interference quality, and it is a preferred frequency by a telecommunications network operator in terms of traffic usage.

6. The method of claim 1, wherein the femto-cell base station is deactivated when no available frequency matches the operational frequency supported by the User Equipment.

7. The method of claim 1, wherein the wireless network interface is a cellular modem module suitable for connecting at least one electronic device to the cellular wireless network.

8. The method of claim 1, wherein said list of frequencies is stored in a Home Node B during a configuration setup.

9. The method of claim 1, wherein said list of frequencies is obtained from the core telecommunications network.

10. A connection manager for reconfiguring an operational frequency and associated bandwidth used by a femto-cell base station, the femto-cell base station being configured to provide coverage to a user equipment by connecting to a core telecommunications network via a gateway device, the femto-cell base station having a fixed network interface for establishing a fixed network connection to said core telecommunications network, and a wireless network interface for establishing a cellular wireless network connection to said core telecommunications network, said cellular wireless network connection being assigned a main frequency and associated bandwidth, the connection manager comprising:
    a processor configured to:
    check a list of frequencies and associated bandwidths available to the wireless network interface;
    determine whether any of the frequencies in said list matches an operational frequency supported by the User Equipment to which the femto-cell base station is providing coverage; and
    select a second frequency from the list of frequencies provided by the core telecommunications network, if at least one frequency matches the operational frequency supported by the User Equipment, said second frequency being established as the operational frequency of the femto-cell base station, wherein said second frequency is supported by the User Equipment, whereby the processor ensures that the femto-cell base station and the wireless network interface each operate at a different frequency.

11. The connection manager of claim 10, wherein said second frequency is selected on the basis that the second frequency is most separated from the main frequency in the radio-frequency spectrum.

12. The connection manager of claim 10, wherein said second frequency is selected on the basis that interference measured in said second frequency with respect to the main frequency is below a pre-established threshold.

13. The connection manager of claim 10, wherein said second frequency is selected on the basis that isolation between the second frequency and the main frequency is highest possible.

14. The connection manager of claim 10, wherein said second frequency is selected on the basis that it fulfills a predefined criterion in terms of interference quality, and that it is preferred by a core telecommunications network operator in terms of traffic usage.

15. The connection manager of claim 10, wherein the femto-cell base station is deactivated when no available frequency matches the operational frequency supported by the User Equipment.

* * * * *